United States Patent
Eudeline et al.

[11] Patent Number: 5,872,827
[45] Date of Patent: Feb. 16, 1999

[54] METHOD FOR PRODUCING A RESULT AND DEVICE FOR THE IMPLEMENTATION THEREOF

[75] Inventors: Patrice Eudeline, Montigny Le Bretonneux; Frank Gansmandel, Paris; Patrice Toillon, Le Pecq, all of France

[73] Assignee: Sextant Avionique, Velizy Villacoublay, France

[21] Appl. No.: 758,461

[22] Filed: Nov. 29, 1996

[30] Foreign Application Priority Data

Dec. 1, 1995 [FR] France .................................. 95 14337

[51] Int. Cl.[6] .................................................. H03K 21/00
[52] U.S. Cl. .................................. 377/27; 377/20
[58] Field of Search ........................ 377/27, 20

[56] References Cited

U.S. PATENT DOCUMENTS

| | | | |
|---|---|---|---|
| 4,464,772 | 8/1984 | Buckley et al. | 377/47 |
| 4,610,013 | 9/1986 | Long et al. | 371/9 |
| 4,979,173 | 12/1990 | Geldman et al. | 377/116 |
| 5,347,559 | 9/1994 | Hawkins et al. | 377/56 |

FOREIGN PATENT DOCUMENTS

| | | |
|---|---|---|
| 0182134A2 | 5/1986 | European Pat. Off. . |
| 0473834A1 | 3/1992 | European Pat. Off. . |
| 0611171A1 | 8/1994 | European Pat. Off. . |
| WO 85/02698 | 6/1985 | WIPO . |

*Primary Examiner*—Margaret Rose Wambach
*Attorney, Agent, or Firm*—Oblon, Spivak, McClelland, Maier & Neustadt, P.C.

[57] ABSTRACT

A method for producing a result prepared from asynchronous external events, wherein two mutually independent counting processes are activated, the temporal coincidence of the ends of counting of these two processes are verified and, on the basis of the information elements pertaining to the verification of each of these two counting processes and according to a specific sequencing of the application considered, a non-consolidated intermediate action is activated for each of the two sequencing processes and, after the verification of the temporal coincidence of the intermediate actions, and taking account of possible external priority actions, a resultant action is produced if all the necessary conditions are fulfilled.

5 Claims, 7 Drawing Sheets

METHOD FOR PRODUCING A RESULT AND DEVICE FOR THE IMPLEMENTATION THEREOF

BACKGROUND OF THE INVENTION

The present invention relates to a method for producing a result and a device to implement this method.

In certain systems such as devices used in aircraft comprising several machines, instruments, sensors and the like that transmit and/or receive optical or electrical signals, these signals are transmitted asynchronously, namely in a manner that is completely independent with respect to one another. In general, these signals travel on a bus known as an "aircraft bus". In order to avoid overlapping of these signals on the bus, a standardized transmission protocol (ARINC 629) controls the timing of transmission from the devices having information to be sent. Each of these devices generally comprises counting and sequencing units, whose pace is set by an external clock. These units receive signals representing various mutually independent external events (signals from sensors, commands, etc.). The sequencer implements an algorithm which, on the basis of different external events and information elements generated by the counting unit, prepares a single result signal representing for example a command or authorization for transmission on the bus to one or more other devices. The various devices have to generate, each in turn, their result signal to prevent any overlapping of information on the bus: this is the task of the ARINC 629 transmission. However, it may happen that, as a result of drifts in the components of the counters and sequencers, the resultant signals from the devices are transmitted outside the temporal windows that are assigned to them. To avoid the detrimental consequences of such phenomena, it is possible to widen the temporal windows. This is not appropriate in certain applications. It is also possible to choose components with reduced drift, but this substantially increases the cost of the devices.

SUMMARY OF THE INVENTION

An object of the present invention is a method which, in a system comprising a bus to which there are connected various devices sending, on this bus, information elements prepared from one or more asynchronous events, can be used to cancel or considerably reduce the risks of overlapping of the information elements transmitted by these devices without causing any deterioration in the performance characteristics of this system and without necessitating costly components.

An object of the invention is also a device for the implementation of such a method.

According to the invention, there is provided a method wherein, from one incident asynchronous signal, two mutually independent counting processes are activated, the temporal coincidence of the ends of counting of these two processes are verified and, on the basis of the information elements pertaining to the verification of each of these two counting processes and according to a specific sequencing of the application considered, a non-consolidated intermediate action is activated for each of the two sequencing processes and, after the verification of the temporal coincidence of the intermediate actions, and taking account of possible external priority actions, a resultant action is produced if all the necessary conditions are fulfilled.

The device according to the invention consists of at least one section with at least one pair of mutually independent decision channels, each section comprising a counting device followed by at least one sequencing device, a first comparison device being connected to the outputs of the counting devices of one pair of one section and a second comparison device being connected to the outputs of the sequencing devices of one pair of one section, the output of the sequencing device of one of the channels of at least one of the pairs of each section being possibly connected to the inputs of at least one of the pairs of this section.

BRIEF DESCRIPTION OF THE DRAWINGS

The present invention will be understood more clearly from the following detailed description of an embodiment, taken by way of a non-restrictive example and illustrated by the drawings, wherein.

MORE DETAILED DESCRIPTION

The invention described below refers to decisions for transmission of information elements on an ARINC 629 type bus, but it is clear that it is not restricted to such an application and that it can be implemented in various systems having to produce an event (a signal to activate or authorize an action for example) as a function of various states and asynchronous signals and of the running of an algorithmic sequence.

Figure 1:
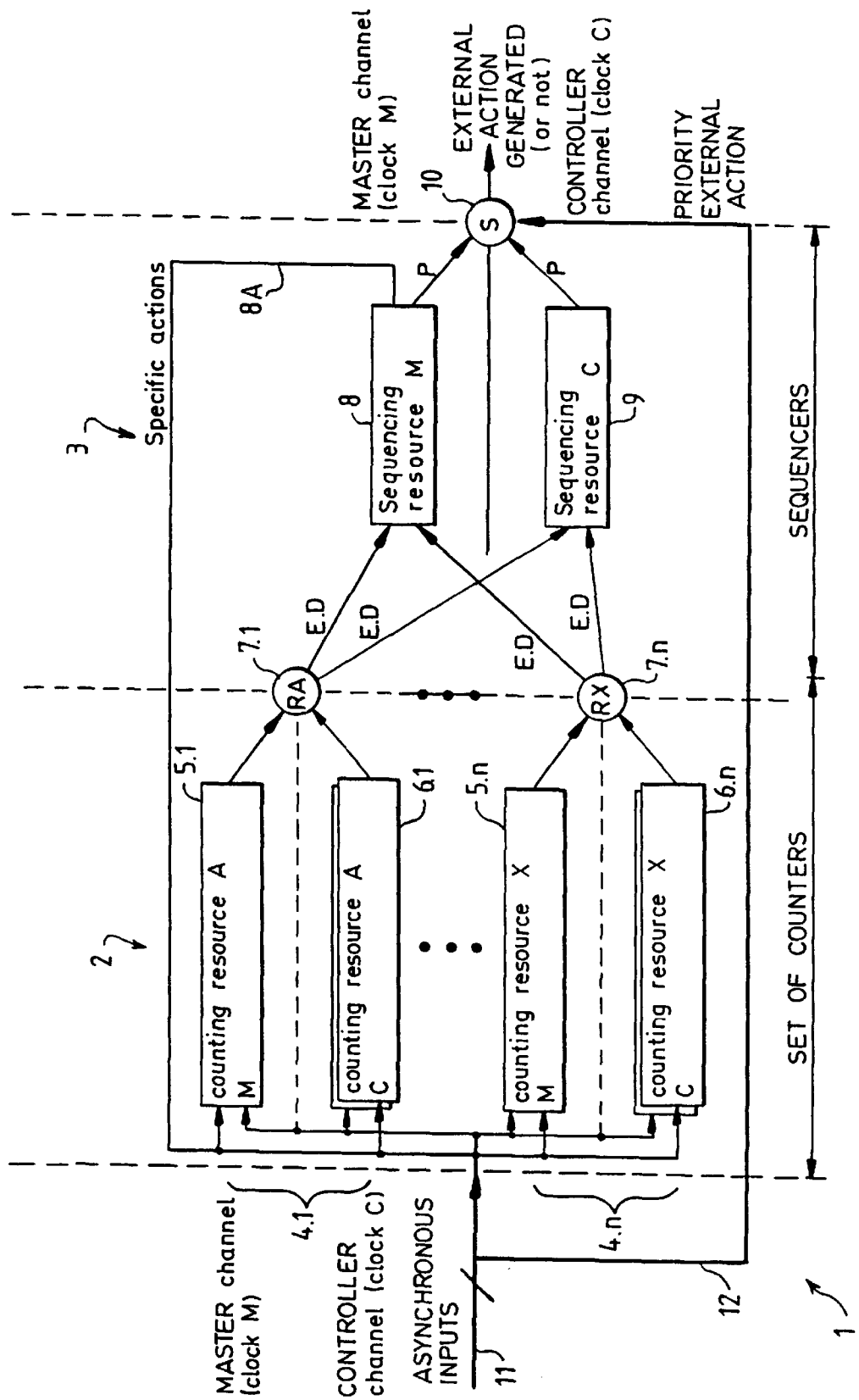
FIG. 1 is a general simplified diagram of a section with several pairs of decision channels according to the invention.

FIG. 1 shows a section 1 of a decision channel according to the invention. In the present description, the term "channel" is understood to mean the circuit comprising a counter and a sequencer. This section consists of two sets: a set 2 of counters followed by a set 3 of sequencers. The set 2 comprises n pairs of identical decision channels 4.1 to 4.n. These pairs of identical channels shall hereinafter be called simply pairs. Each pair 4.1 to 4.n comprises a Master counting resource (5.1 to 5.n) and a Controller counting resource (6.1 to 6.n). These resources are all mutually independent. In each pair, the outputs of the two resources are connected to a "functional meeting point" (7.1 to 7.n) as described here below. The set 3 comprises a Master sequencing resource 8 and a Controller sequencing resource 9. The outputs of each of the meeting points 7.1 to 7.n are each connected to the resource 8 and to the resource 9. The number of pairs 8, 9 is not limited. A sequencing output 8.A of the resource 8 is connected to the inputs of the counting resources 5.1 to 5.n and 6.1 to 6.n. The outputs (of the end of sequencing) of the resources 8 and 9 are connected to a consolidation and decision logic unit 10, the output of which constitutes the consolidated external action output of the section 1. Asynchronous input information elements 11 are sent to the different resources 5.1 to 5.n and 6.1 to 6.n. Among these information elements, there may also be an information element 12 which, in this case, is a priority external event sent directly to the function 10. This external priority event, when it occurs, inhibits the output of the function 10. The resources 5.1 to 5.n and 8 are called "Master" resources while the resources 6.1 to 6.n and 9 are called "Controller" (and not "slave") resources because the internal commands (8.A) for the driving of the set 2 by the set 3, namely the commands pertaining to the state of the counters (resetting or setting in a determined state) of the set 2 are produced solely by the Master channel (Master counters and Master sequencer), the "Controller" resources being then totally independent of the "Master" resources as specified above.

In general, the resources of the set 2 provide for the counting and monitoring functions and act as a consolidated time base while the resources of the set 3 fulfill the sequencing and monitoring functions, acting as a device for the consolidated preparation and generation of the action that must be delivered by the section 1.

At the output of the circuits 7.1 to 7.n, information elements are obtained: these are information elements of the "elapsed or non-elapsed counting time" type and "inconsistency of the flow of counting time" type. This enables the set 3 to control the sequencing algorithm (implemented by the resources 8 and 9, independently of each other) associated with the event to be produced at the output of the circuit 10. The set 3 may provide the set 2, through the link 8.A, with the internal driving commands in the form of requests for the modification of the state of its counters.

The "functional meeting points" 7.1 to 7.n and 10 are logic circuits that can be used to determine the simultaneity of the arrival, in a temporal window, of the signals coming from the counting and sequencing resources respectively that are connected to them. These signals are produced by the counters when they reach a determined state (by construction, or by the sequencing resource 8). The width of these temporal windows is a function of the acceptable relative drifts of the clocks for the driving of the counting and sequencing resources as well as of the intrinsic configuration of the corresponding resources. When said signals reach the same temporal window, the logic circuit 7.1 to 7.n and 10 produce a "consolidated" output signal, namely a signal for which there is certainty that it has been produced by circuits that were not defective, this certainty being based on the independence of the configuration and the driving of the Master channel with respect to the configuration and the driving of the Controller channel. If not, namely if, for a given pair 4.1 to 4.n, none of the Master and Controller signals reaches the temporal window, or else if only one of them is present in this window, owing to the drift of a channel (Controller) with respect to the other channel (Master), the "meeting point" reports this fact to the other channel and to the other set 3. This set 3 then inhibits the production of the event that ought to be produced by the circuit 10.

In each section, the only common point between the Master channel and the Controller channel is constituted by the corresponding "meeting points". This meeting point is advantageously very simple to build, and it is based on elementary logic circuits. Thus, high reliability of information on "elapsed counting time" or "end of sequence" for example is obtained, resulting in high reliability for the entire section.

Figure 2:
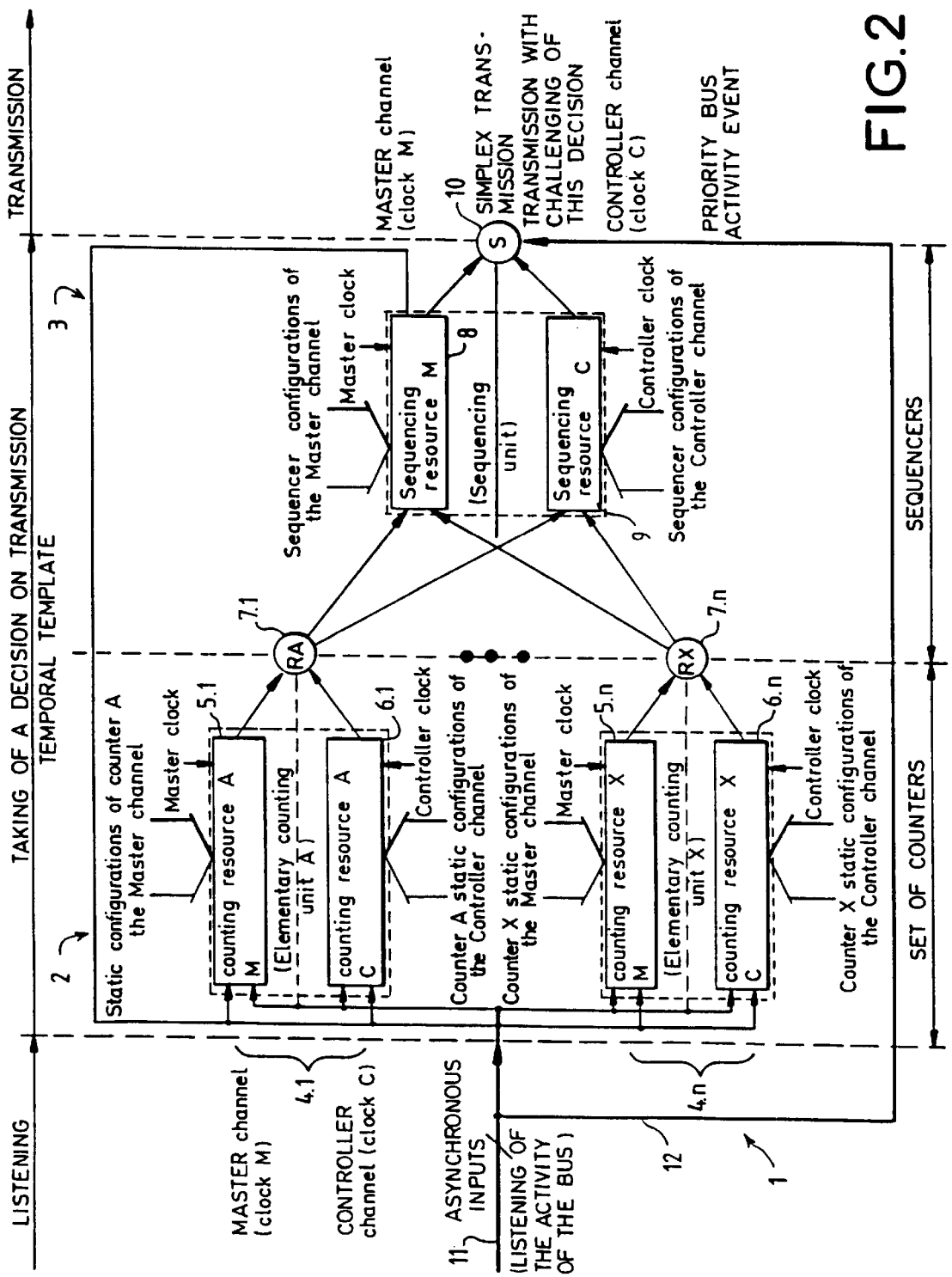
FIG. 2 is a diagram similar to that of FIG. 1, showing the different information elements that could be sent to the different devices that comprise the section in the exemplary application to the taking of decisions for transmission on a bus.
Figure 3:
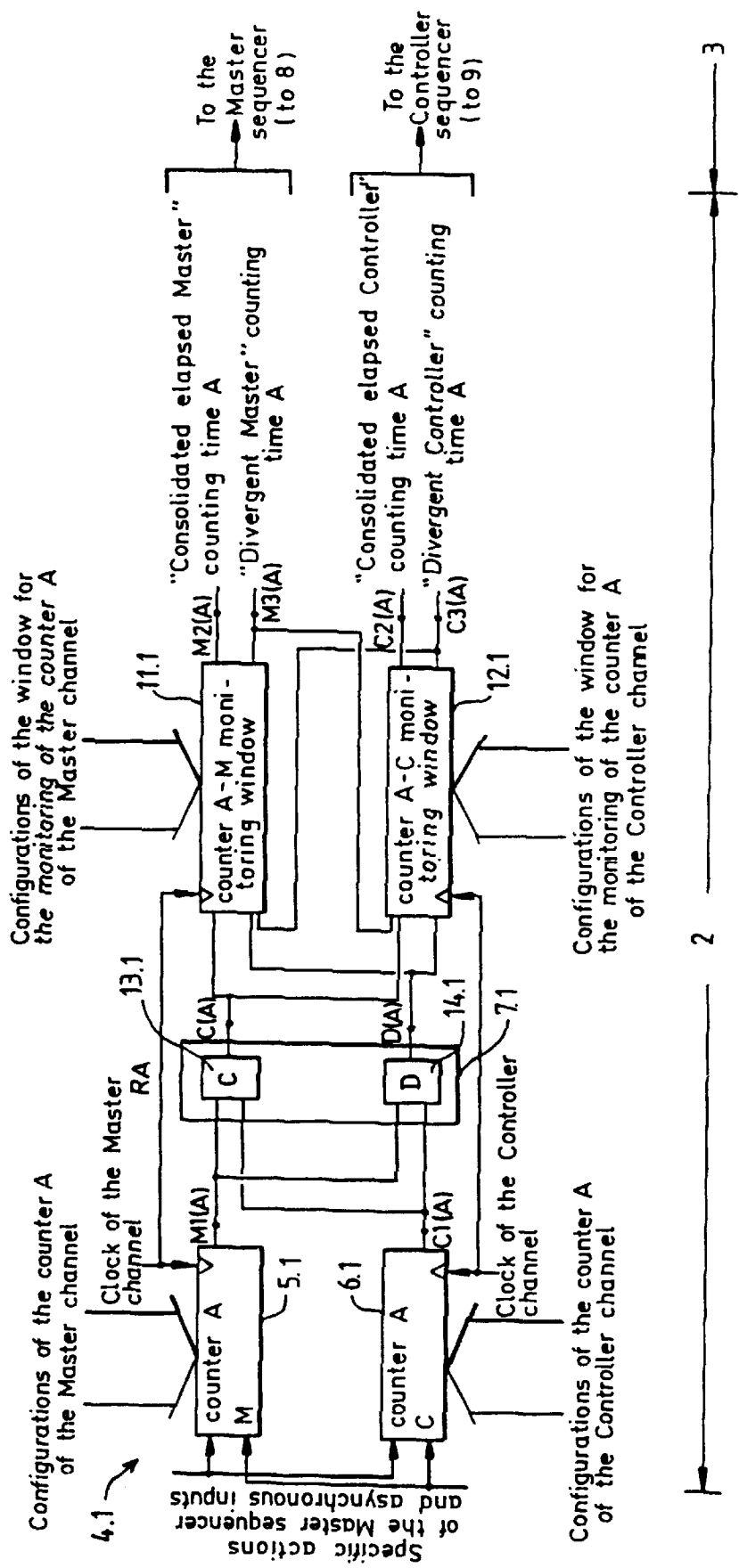
FIG. 3 is a detailed diagram of circuits of the section of FIG. 1.

For a detailed view of the working of the circuits described above, reference will be made to FIGS. 2 and 3. As an example, the pair 4.1 will be examined.

The Master resource of the pair 4.1 comprises the counter 5.1 giving an intermediate event (non-consolidated information) M1(A) of the "elapsed or non-elapsed Master counting time" type and a window 11.1 for the monitoring of the counters 5.1 and 6.1 connected after the meeting point 13.1, giving comprehensive events (consolidated information) M2(A) of the "consolidated or non-consolidated elapsed Master counting time type" and M3(A) of the "divergent or non-divergent Master counting time type".

In said pair 4.1, the counting Controller resource comprises the counter 6.1 providing an intermediate event (non-consolidated information) C1(A) of the "elapsed or non-elapsed Controller counting time" type and a window 12.1 for the monitoring of the counters 5.1 and 6.1, giving comprehensive events (consolidated information elements) C2(A) of the "consolidated or non-consolidated elapsed Controller counting time type" and C3(A) of the "divergent or non-divergent Controller counting time type".

The two resources, namely the Master resource 5.1 and the Controller resource 6.1, are independent of each other and share the consolidation and detection logic unit 7.1. This logic unit may comprise sets of logic gates whose construction will be easy for those skilled in the art on the basis of a reading of the present description. The logic unit has two logic subsets: 13.1 (for consolidation) and 14.1 (for detection of divergence). The pairs 4.1 to 4.n have the same structure, and only their driving commands (the stopping and starting of the counters and the setting of the counters at a determined level) and their static configurations are specific to each pair. These commands are external or given by the Master channel of the set 3.

The "functional meeting point" between the counters 5.1 and 6.1 of the pair 4.1 is obtained when the two intermediate events pertaining to "elapsed counting time" (M1 and C1) coming from the Master and Controller channels are present (as a function of the application considered) together in a temporal window, the width of which is a function of the value assigned to the counters 5.1 and 6.1 (case 1 and case 2 of FIG. 4) or else may be configured as a function of the current state of the sequencing (produced by the set 3). In this case, it may be considered that, on the whole, the flow of the counting time of the counters 5.1 and 6.1 is normal.

Figure 4:
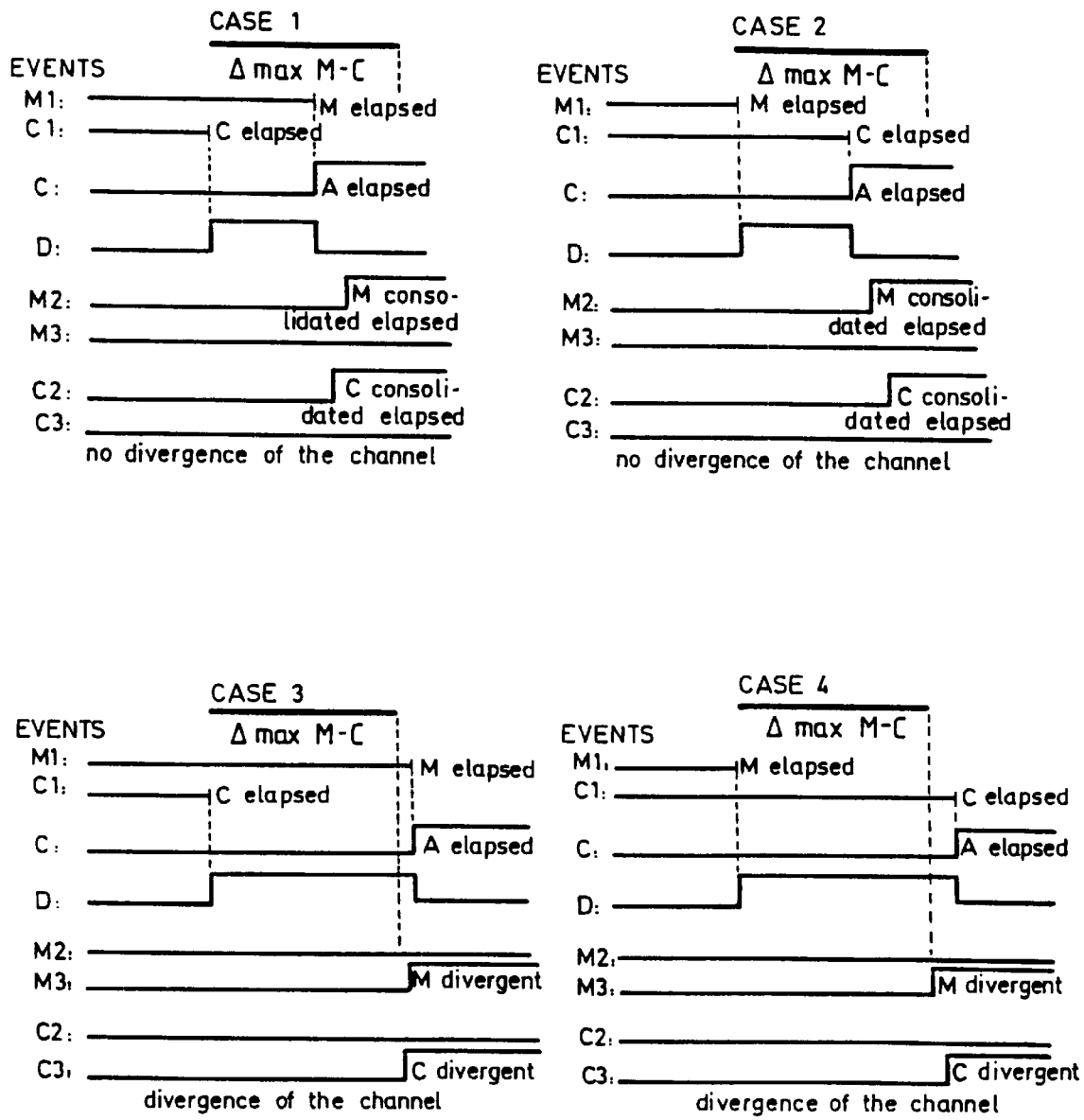
FIG. 4 is a set of timing diagrams of signals appearing in the circuit of FIG. 1, FIGS. 5A and 5B are diagrams of functional elements of the circuit of FIG. 1.

The absence of a "functional meeting" occurs when one of the two intermediate events pertaining to "elapsed counting time" coming from the Master channel or from the Controller channel does not reach the predefined temporal window (case 3 and case 4 of FIG. 4). An information element is then produced on "divergent counters": this means that, on the whole, the flow of time of the pair 4.1 is abnormal. This may lead to an exceptional procedure (activation of a sequence of rallying towards determined states or the action of an external control system that is not shown).

The first of the two intermediate events M1(A) or C1(A) to occur prompts the activation of the signal D(A) (at output of the subset 14.1). This indicates a difference in the arrival of the "elapsed" state of one of the two counters of the pair 4.1.

After re-synchronization (by the clock signals of the windows 11.1 and 12.1), the signal D(A) prompts the starting of the reverse counting of the monitoring window of the Master channel and the Controller channel. The second of the intermediate events M1(A) or C1(A) to occur prompts the deactivation of the signal D(A) and the activation of the signal C(A) which signifies "comprehensively elapsed counting time".

If the activation of the signal C(A) occurs before the end of the flow of the monitoring window (as defined by the configuration of the counters 5.1 and 6.1), their reverse counting (or forward counting) operations stop and the comprehensive events M2(A) and C2(A) are produced. This means the consolidation of the information elements of the counters 5.1 and 6.1 which are desynchronized so that they can be easily and surely exploited by the resources of the set 3.

The first of the comprehensive events M3(A) or C3(A) (at the output of the windows 11.1 and 12.1) to occur forces the temporal positioning of the other event M3(A) or C3(A) and inhibits all the subsequent operations of activation of the comprehensive events M2(A) and C2(A) before a new setting of the counters 5.1 and 6.1 at a determined value. This means that the first of these two counters 11.1 and 12.1 of the monitoring windows that reaches its reverse counting (or forward counting) value has detected a width of the signal D(A) greater than that determined for the current configuration of the counters of the pair 4.1. This generates the "divergent counters" event and prompts the activation of an exceptional procedure.

Figure 5A:
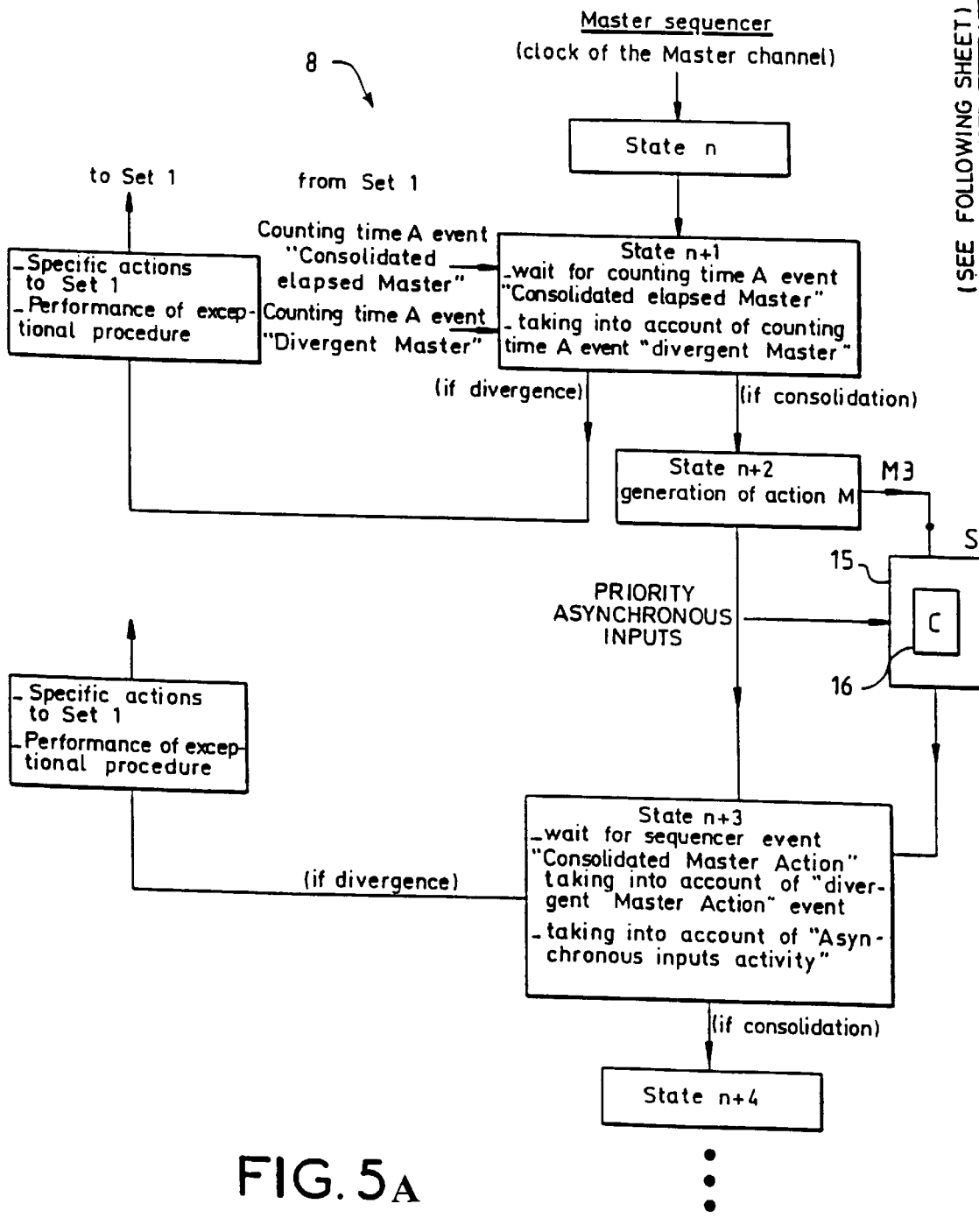
Figure 5B:
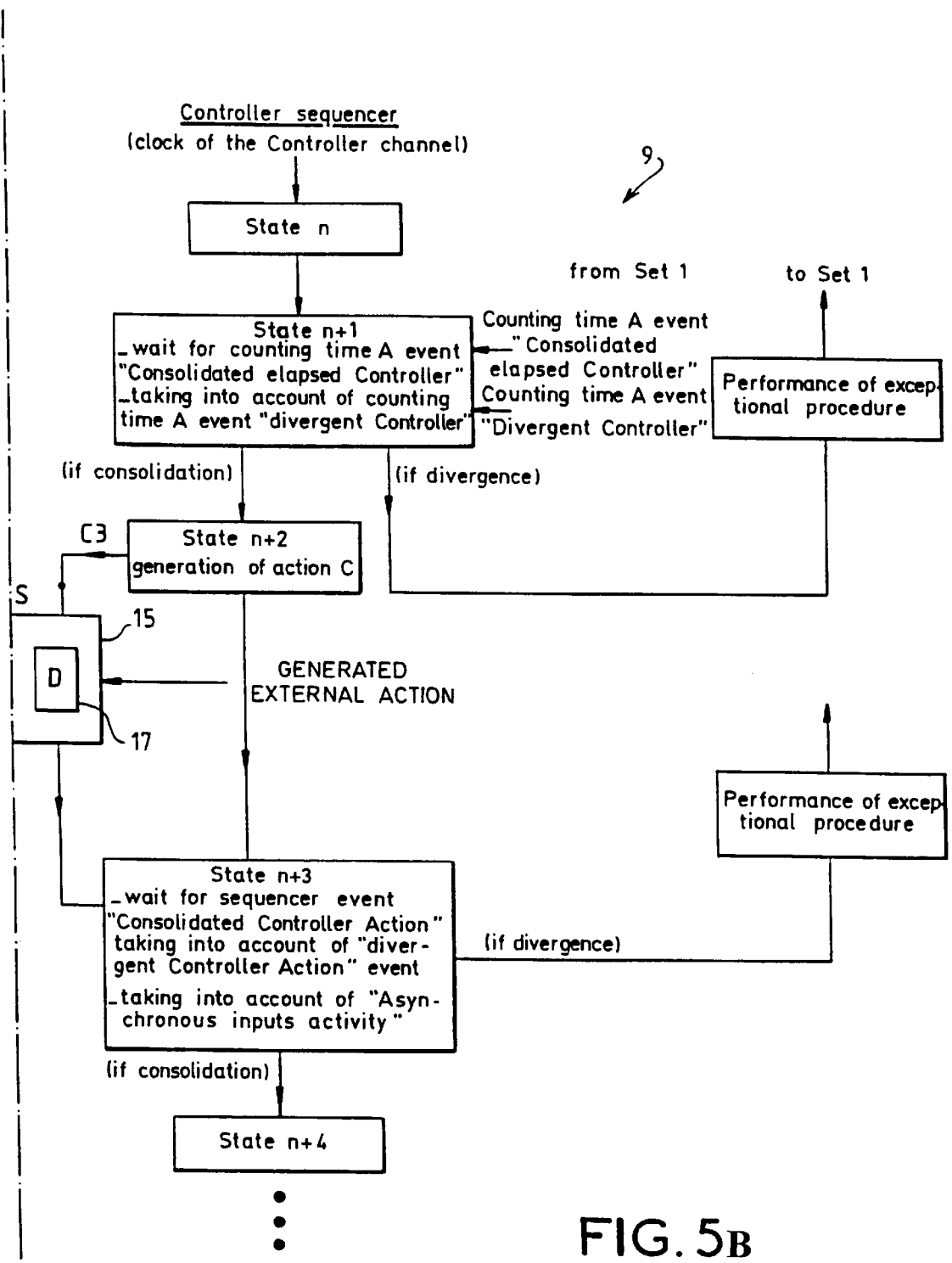

As shown in FIGS. 5A and 5B, the sequencing and monitoring set 3 consists of two identical resources: one called a "Master" (8) resource and the other called a "Controller" (9) resource. Each resource uses the information on "consolidated elapsed counting time" and "divergent counters" given by the set 2 to generate its non-consolidated intermediate action (action M and action C).

From the functional viewpoint, the resources 8 and 9 are structured in the form of successive sequencing cells that are independent of one another. At the end of each of these cells, a logic unit 15, comprising subsets 16 (of the type C such as 13.1) and 17 (of the type D such as 14.1) similar to those of the unit 7.1, enables the management of the "functional meeting points" between Master and Controller. These cells are identical (in the present case) with respect to their numbers of states. Their relative drift is fixed and predefined. The dissimilar feature is that the Master channel carries out the specific actions towards the set 2 (control of the counters), while the Controller channel has no external action.

A logic unit 17 is located at each point of generation of a secured external action of the comprehensive channel (Master+Controller). This unit also takes account directly of any asynchronous priority external event. This makes it possible, at the ultimate point, to challenge the decision for the generation of the action and reactivate the sequencing.

The "functional meeting point" of the sequencing unit is obtained when the two intermediate events action M and action C, produced by the Master and Controller channels, reach a predefined window of temporal coincidence with a minimal size. This means that comprehensively the two channels have arrived in synchronism and validate the external action.

The absence of any "functional meeting point" occurs when one of the two intermediate events, action M or action C, does not reach the predefined temporal window, namely on the whole the two channels do not arrive in synchronism. This prohibits the generation of the external action and causes the execution of an exceptional procedure.

Figure 6:
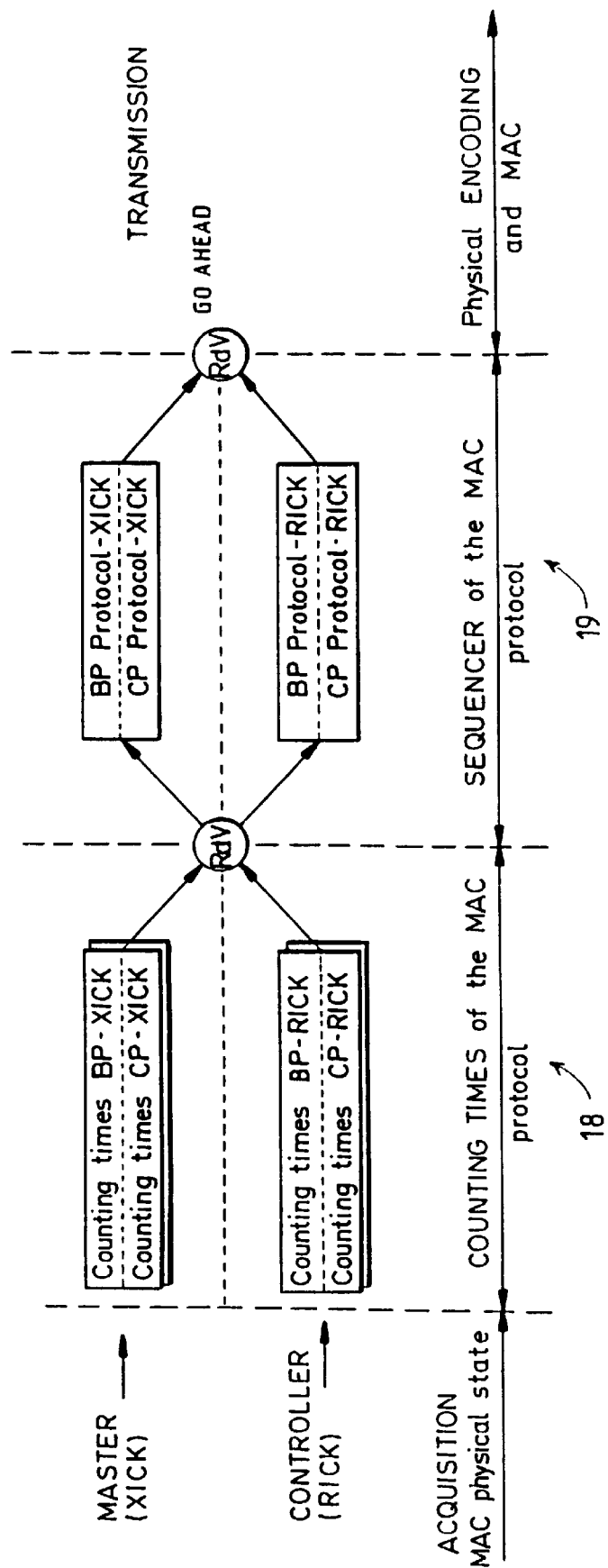
FIG. 6 is a simplified diagram of the application of the circuit of the invention to an ARINC 629 bus.

The drawing of FIG. 6 pertains to the case of the ARINC 629 bus corresponding to an application advantageously integrated into a component of a comprehensive Master-Controller structure for making a decision for a transmission which is the simplex starting of a "GO AHEAD" transmission.

The set 18 (similar to the set 2) consists of a group of five counters for the signals generally named: TI, ASG/SG, TG, PSG and AT. The counters also have a paired structure, each counter comprising a pair constituted by a Master and a counting Controller (TI_X/TI_R for the counter TI, for example) and a pair constituted by a Master and a monitoring Controller (WTI_X/WTI_R for the counter TI, for example). This group provides consolidated time bases (TI elapsed_X/TI elapsed_R and TI divergent_X/TI divergent_R) to the set 19 (similar to the set 3) to prepare the sequencing BP or CP of the ARINC 629 standard.

The current state of the bus (active or inactive) is given by a listening system external to the system described herein. This information element is asynchronous. It is used for driving the counters ASG/SC, TG and PSG. The counting result of each counter comes from two counters, one working on the basis of the clock signals XICK and the other on the basis of the clock signals RICK. The common consolidation at each counter corresponds to a logical AND operation. The starting of each monitoring of a counter corresponds to an Exclusive OR logical operation.

The set 19 (sequencer of the MAC protocol or medium access control protocol) consists of a sequencer dedicated to each of the protocols BP or CP. Each sequencer has a paired structure, the elements of which are identical. The Master works on the basis of the clock signal XICK while the Controller works on the basis of the clock signal RICK. They use the consolidated time bases of the set 18 as well as the external information on the "current state of the bus".

The Controller does not produce any external action (no retroaction towards the set 18). The Master provides the commands for the control of the counters of a set 18 (START TI, ELAPSE TI, RESET SG/AG, RESET TG, RESET PSG, START AT).

The result of the running of each section of the sequencing is an intermediate signal, "GO_AHEAD" Master and "GO_AHEAD" Controller. The common consolidation of the channels occurs solely at the level of these two signals and corresponds to their logical AND function. The starting of the monitoring corresponds to their logical Exclusive OR function.

The unit for the consolidation and monitoring of the set 19 performs the ultimate step for the accounting of the external information on the "current state of the bus" so that in the event that activity on the ARINC 629 bus is detected, the decision to transmit can be immediately challenged. This process is of vital importance in accounting for the real activity of the bus throughout the channel for taking decisions on transmission (listening of the carrier).

The structure of this decision channel makes it possible, at output, to obtain precise values (to within one clock cycle) of the different standardized times (TI, TI+TG, PSG+TG, ASG/SG+TG, TG, AT). Through this precision, the temporal precision of the transmission from the device on the time-multiplexed ARINC 629 bus is ensured.

The method of the present invention thus enables the detection and reporting of any "single fault" (a single fault from the temporal viewpoint) and generally of most double faults. The term "fault" covers errors of configuration, deterioration (short circuits, jamming at a logic level, open circuit, etc.), the absence of clock signals, frequency variations, etc. It also enables compliance with very precise temporal templates (up to one clock period), thus improving the temporal fineness for making a decision for action.

What is claimed is:

1. A method comprising the steps of:

activating a first counting process from an incident asynchronous signal;

activating a second counting process from said incident asynchronous signal, wherein said first counting process and said second counting process are mutually independent;

verifying a temporal coincidence of a termination of counting of said first counting process and a termination of counting of said second counting process;

activating a first intermediate action for said first counting process based on a first plurality of information elements related to said step of verifying a termination and according to a specific sequencing of a first application;

activating a second intermediate action for said second counting process based on a second plurality of information elements related to said step of verifying a termination and according to a specific sequencing of a second application, wherein said first intermediate action and said second intermediate action are non-consolidated;

verifying a temporal coincidence of said first intermediate action and said second intermediate action;

determining whether a plurality of predetermined external priority actions has occurred; and producing a resultant action when it is determined that said temporal coincidence of said first intermediate action and said second intermediate action has been verified and said plurality of predetermined external priority actions has occurred.

2. A method according to claim 1, wherein the first counting process and the second counting process are activated from one incident asynchronous signal.

3. A method according to claim 1 or 2, implemented for an ARINC 629 bus.

4. A device comprising:

a section having at least one pair of mutually independent decision channels, each one of said at least one pair of said decision channels comprising a master decision channel and a controller decision channel, each one of said master decision channel including a master counting means having at least one master counting means input and a master counting means output followed by a master sequencing means having a master sequencing means output, each one of said controller decision channel including a controller counting means having at least one controller counting means input and a controller counting means output followed by a controller sequencing means having a controller sequencing means output;

first comparison means connected to said master counting means output and said controller counting means output of each said pair; and a second comparison means connected to said master sequencing means output and said controller sequencing means output.

5. A device according to claim 4, wherein one of said master sequencing means output and said controller sequencing means output is connected to at least one of said master counting means input and said controller counting means input of at least one of said at least one pair of said section.

* * * * *

UNITED STATES PATENT AND TRADEMARK OFFICE
CERTIFICATE OF CORRECTION

PATENT NO. : 5,872,827
DATED : February 16, 1999
INVENTOR(S) : Patrice EUDELINE et al.

It is certified that error appears in the above-identified patent and that said Letters Patent is hereby corrected as shown below:

On the title page, item [75], the second Inventor's first name should be:

--Franck--

Signed and Sealed this

Twentieth Day of July, 1999

Attest:

Q. TODD DICKINSON

*Attesting Officer*  *Acting Commissioner of Patents and Trademarks*